United States Patent
Lin

(10) Patent No.: US 10,568,168 B1
(45) Date of Patent: Feb. 18, 2020

(54) LIGHTING SYSTEM

(71) Applicant: CHICONY POWER TECHNOLOGY CO., LTD., New Taipei (TW)

(72) Inventor: Chen-Chi Lin, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/287,718

(22) Filed: Feb. 27, 2019

(30) Foreign Application Priority Data

Dec. 13, 2018 (TW) .............................. 107145049 A

(51) Int. Cl.
*H05B 37/02* (2006.01)
*H05B 33/08* (2006.01)

(52) U.S. Cl.
CPC ..... *H05B 33/0809* (2013.01); *H05B 33/0812* (2013.01); *H05B 33/0815* (2013.01); *H05B 33/0821* (2013.01); *H05B 33/0845* (2013.01); *H05B 37/02* (2013.01)

(58) Field of Classification Search
CPC ............ H05B 33/0815; H05B 33/0845; H05B 33/0824; H05B 33/083; H05B 33/0812; H05B 33/0821; H05B 33/0884; H05B 33/0809; H05B 33/089; H05B 37/02; H05B 33/0887; H05B 41/2828; H05B 33/0842; Y02B 20/346; Y02B 20/343; H02M 1/42; H02M 2001/0032; H02M 2001/0058; H02M 3/1582; H02M 3/33569; H02M 3/3376; H02M 1/4258
See application file for complete search history.

(56) References Cited

U.S. PATENT DOCUMENTS

| | | | | |
|---|---|---|---|---|
| 7,486,033 | B2 * | 2/2009 | Chen ................... | H05B 33/0842 307/64 |
| 8,564,210 | B2 * | 10/2013 | Hamamoto ............. | F21S 8/031 315/185 R |
| 8,749,164 | B2 * | 6/2014 | Chung ............... | H05B 33/0824 315/185 S |
| 8,860,317 | B2 * | 10/2014 | Park ................... | H05B 33/0815 315/165 |

(Continued)

FOREIGN PATENT DOCUMENTS

| CN | 101959352 A | 1/2011 |
|---|---|---|
| CN | 104094668 B | 5/2016 |

(Continued)

*Primary Examiner* — Vibol Tan
(74) *Attorney, Agent, or Firm* — Muncy, Geissler, Olds & Lowe, P.C.

(57) ABSTRACT

A lighting system includes a power supply unit, a power conversion unit, a lighting unit, a first switching unit, and a first reset unit. The power supply unit is used to supply a first and a second power signal. The power conversion unit receives and converts the first power signal. According to the first power signal, a first lighting module of the lighting unit emits light. The first switching unit is connected to a first node between the first lighting module and a second lighting module for receiving the second power signal, so that the second lighting module emits light according to the second power signal. The first reset unit receives the second power signal; wherein when the second lighting module changes from lighting to no lighting, the first reset unit causes the power conversion unit to stop operating and then restart.

14 Claims, 4 Drawing Sheets

(56) References Cited

U.S. PATENT DOCUMENTS

| | | | |
|---|---|---|---|
| 9,781,789 B1 | 10/2017 | Lee et al. | |
| 9,949,332 B2 * | 4/2018 | Wang | H05B 33/0815 |
| 10,000,150 B2 | 6/2018 | Muramatsu et al. | |
| 10,165,645 B2 * | 12/2018 | Tu | H05B 33/0857 |
| 10,237,934 B1 * | 3/2019 | Lin | H05B 33/0815 |
| 2008/0088241 A1 * | 4/2008 | Chen | H05B 33/0842 |
| | | | 315/88 |
| 2011/0018441 A1 | 1/2011 | Tanaka et al. | |
| 2011/0043120 A1 | 2/2011 | Panagotacos et al. | |
| 2013/0082602 A1 | 4/2013 | Bradford | |
| 2013/0264954 A1 * | 10/2013 | Chung | H05B 33/083 |
| | | | 315/186 |

FOREIGN PATENT DOCUMENTS

| | | |
|---|---|---|
| CN | 105539271 A | 5/2016 |
| CN | 206264885 U | 6/2017 |
| TW | I407656 B1 | 9/2013 |
| TW | M461278 U | 9/2013 |
| TW | I517749 B | 1/2016 |
| TW | I562524 B | 12/2016 |
| TW | 201705817 A | 2/2017 |

* cited by examiner

LIGHTING SYSTEM

BACKGROUND OF THE INVENTION

1. Field of the Invention

The present invention relates to a lighting system, particularly to a lighting system capable of controlling single or multiple lighting modules.

2. Description of the Related Art

The lighting system of today's vehicle contains various lamp functions such as daytime running light, low beam, high beam, turn signals, fog light and position light. Due to energy saving and styling requirements, various types of vehicle lights have gradually changed from halogen light to LED light. However, in the prior arts, different lamp functions of LED lights may require respective power sources for driving LEDs, which may cause the power supply of LED to have a larger volume, higher cost, and more electronic components, thus become a waste of resources. In another aspect, when the LED lighting is changed from the usage of numerous LEDs to the usage of less LEDs (e.g., switched from high beam to low beam), the capacitor located at the output of the power converter will cause a peak current that is much greater than a steady-state current outputting to the LEDs due to the instantaneous voltage change of the capacitor and the continuous energy delivery of the power converter, thus result in an inrush current. As a result, the electronic components are likely to be damaged owing to the impact of the inrush current.

Accordingly, it is necessary to devise a new lighting system to solve the deficiency in the prior art.

SUMMARY OF THE INVENTION

It is a major objective of the present invention to provide a lighting system with the effect of controlling the lighting of single or multiple lighting modules.

To achieve the above objective, the lighting system in the present invention includes a power supply unit, a power conversion unit, a lighting unit, a first switching unit and a first reset unit. The power supply unit is used to supply a first power signal and a second power signal. The power conversion unit is electrically connected to the power supply unit for receiving and converting the first power signal. The lighting unit includes a first lighting module and a second lighting module connected to each other in series. Specifically, the first lighting module is electrically connected to the power conversion unit, and emits light or not according to the first power signal. The first switching unit is electrically connected to power supply unit for receiving the second power signal, and connected to a first node between the first lighting module and the second lighting module to cause the second lighting module to emit light or not according to the second power signal. The first reset unit is electrically connected to the power supply unit and the power conversion unit for receiving the second power signal; wherein when the second lighting module changes from lighting to no lighting, the first reset unit causes the power conversion unit to stop operating and then restart.

DETAILED DESCRIPTION OF THE PREFERRED EMBODIMENT

Hereinafter, the technical content of the present invention will be better understood with reference to preferred embodiments.

Figure 1:
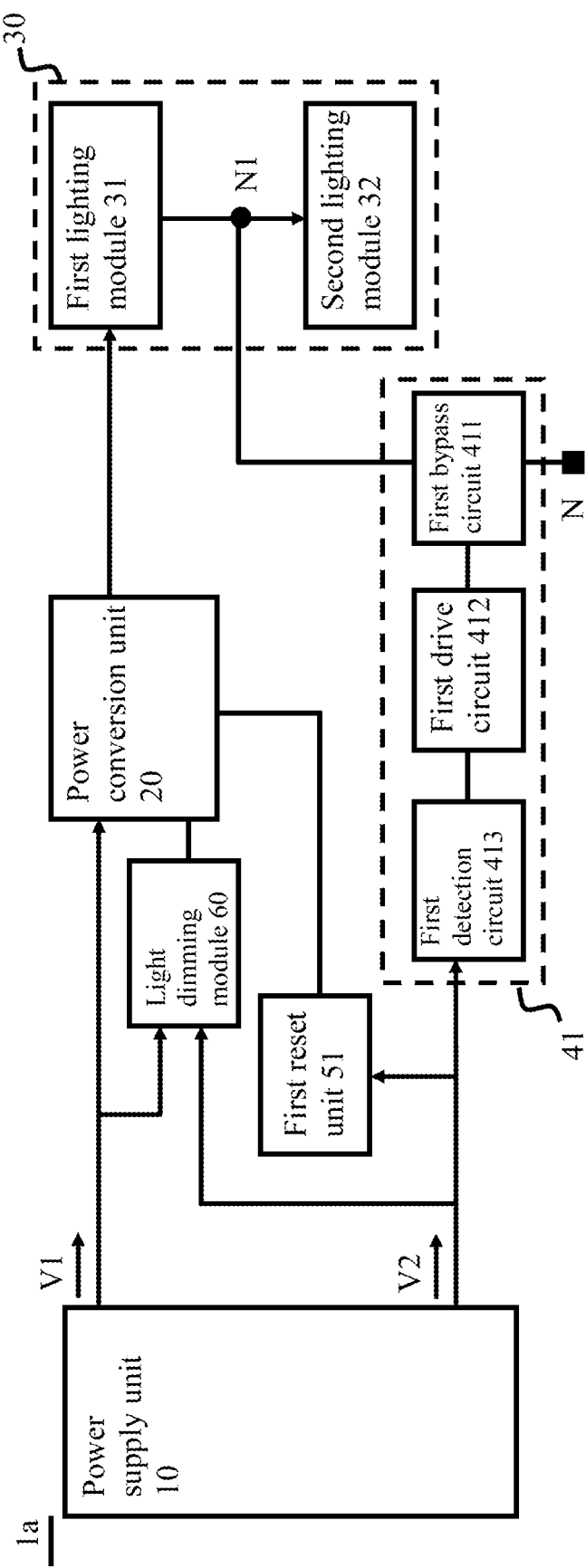
FIG. 1 is an architecture diagram of a lighting system in a first embodiment of the present invention.

Hereinafter please first refer to FIG. 1 for an architecture diagram of a lighting system in a first embodiment of the present invention. It should be noted that although the following uses the terms "first", "second", etc. to describe various components, these components should not be limited by the terms. The terms are used to distinguish one component from another. For example, without departing from the scope of the various described embodiments, the first lighting module may be referred to as a second lighting module, and similarly, the second lighting module may be referred to as a first lighting module. Similarly, the first lighting module and the second lighting module are both lighting modules, but they are not the same lighting module.

In the first embodiment of the present invention, the lighting system 1a includes a power supply unit 10, a power conversion unit 20, a lighting unit 30, a first switching unit 41, a first reset unit 51, and a light dimming module 60. The power supply unit 10 is used to supply a first power signal V1 and a second power signal V2. The electrical physical quantities (e.g., voltage, current, power, etc.) of the first power signal V1 and the second power signal V2 generated by the power supply unit 10 may be the same or different, but the present invention is not limited thereto. The power conversion unit 20 is electrically connected to the power supply unit 10. The power conversion unit 20 may be a switching power converter for receiving and converting the first power signal V1. The lighting unit 30 includes a first lighting module 31 and a second lighting module 32 connected to each other in series. The first lighting module 31 and the second lighting module 32 may be two LED strings, respectively. The number of the LEDs connected in series to form each LED string may be the same or different, but the present invention is not limited thereto. The first lighting module 31 is electrically connected to the power conversion unit 20, and emits light or not according to the first power signal V1. In the embodiment of the present invention, the power conversion unit 20 may be a Buck-Boost Converter in which the negative terminal of the output is not electrically connected to the negative terminal of the input, to appropriately increase or decrease the required voltage according to the number of the LEDs of the first lighting module 31 or the second lighting module 32 to emit light, but the present invention is not limited to this type of converter.

The first switching unit 41 is electrically connected to the power supply unit 10 for receiving the second power signal V2, and electrically connected to a first node N1 between the first lighting module 31 and the second lighting module 32. The first switching unit 41 can cause the second lighting module 32 to emit light or not according to the second power signal V2. The first reset unit 51 is electrically connected to the power supply unit 10 and the power conversion unit 20 for receiving the second power signal V2. When the second lighting module 32 changes from lighting to no lighting, the first reset unit 51 causes the power conversion unit 20 to stop operating and then restart. The light dimming module 60 is electrically connected to the power conversion unit 20, and simultaneously electrically connected to the input circuits of the first power signal V1 and the second power signal V2. The light dimming module 60 adjusts the amperage value of the current that is generated by the power conversion unit 20 corresponding to the first power signal V1 and is outputted to the lighting unit 30, according to the condition that only the first power signal V1 is inputted to the light dimming module 60 or both the first power signal V1 and the second power signal V2 are inputted to the light dimming module 60.

In the first embodiment of the present invention, the first switching unit 41 includes a first bypass circuit 411, a first drive circuit 412, and a first detection circuit 413. The first bypass circuit 411 is electrically connected between the first node N1 and a negative terminal N. The first drive circuit 412 is electrically connected to the first bypass circuit 411. The first detection circuit 413 is electrically connected to the first drive circuit 412 for receiving the second power signal V2. Accordingly, when the power supply unit 10 only supplies the first power signal V1, the current generated corresponding to the first power signal V1 flows through the first lighting module 31 and the second lighting module 32 connected to each other in series, such that the first lighting module 31 and the second lighting module 32 emit light at the same time. When the power supply unit 10 further supplies the second power signal V2, the first detection circuit 413 detects the second power signal V2, then the first bypass circuit 411 is on by the first drive circuit 412, and the current generated corresponding to the first power signal V1 flows directly from the first node N1 to the negative terminal N because the second lighting module 32 is bypassed without lighting.

Figure 2:
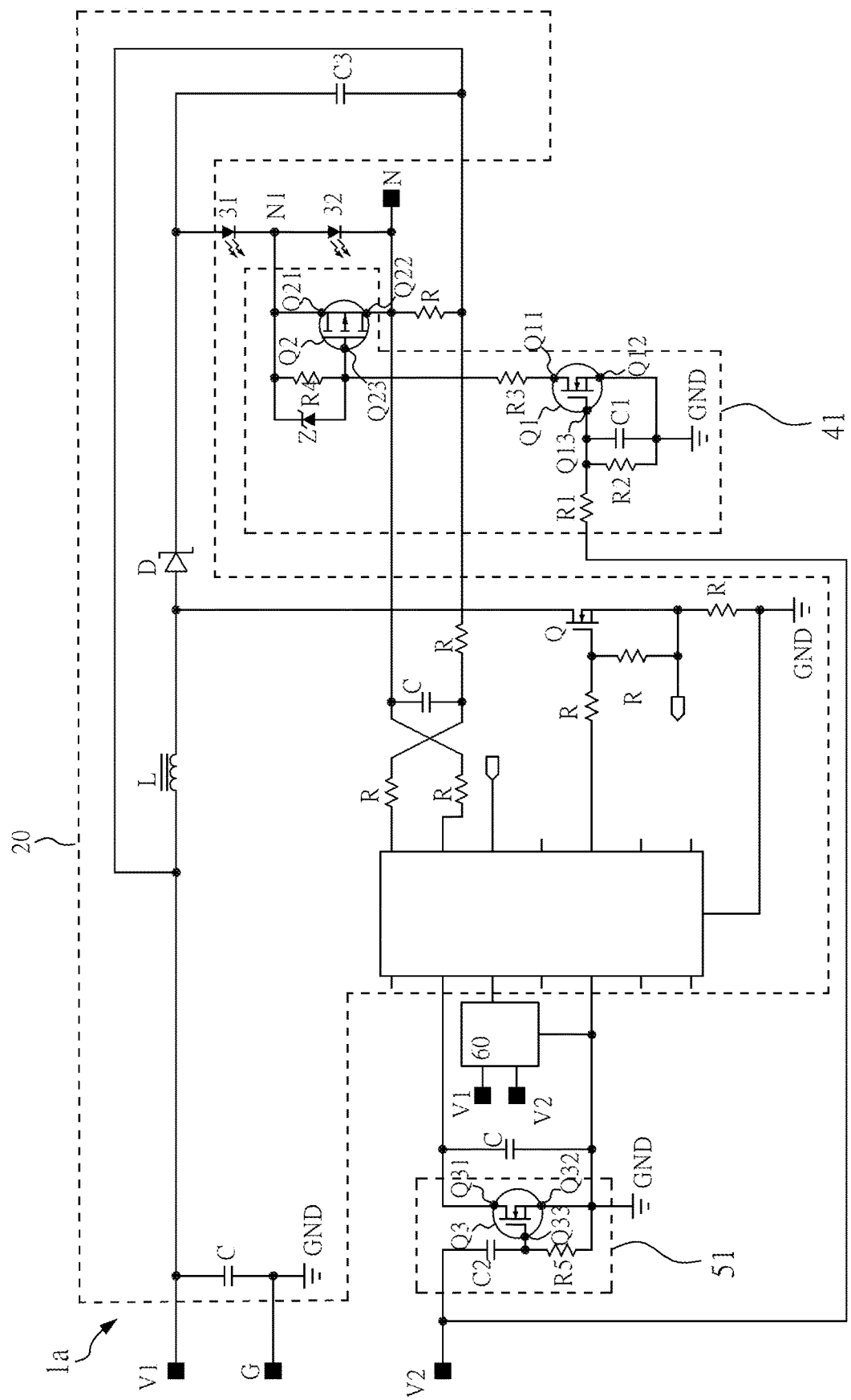
FIG. 2 is a circuit configuration diagram of the lighting system in the first embodiment of the present invention.

Hereinafter, please refer to FIG. 2 for a circuit configuration diagram of the lighting system in the first embodiment of the present invention.

In the first embodiment of the present invention, the first bypass circuit 411 includes a bypass switching component Q2 electrically connected between the first node N1 and the negative terminal N. The bypass switching component Q2 is a field effect transistor, including a first terminal Q21 that is a source terminal, a second terminal Q22 that is a drain terminal, and a control terminal Q23 that is a gate terminal. The first terminal Q21 is electrically connected to the first node N1. The second terminal Q22 is electrically connected to the negative terminal N. The control terminal Q23 is used to control whether the first terminal Q21 and the second terminal Q22 are conducted to each other.

The first drive circuit 412 includes a Zener diode Z, a third resistor R3, an impedance component R4, and a drive switching component Q1. The Zener diode Z and the impedance component R4 are electrically connected between the first node N1 and the control terminal Q23 of the bypass switching component Q2 for stabilizing the bias voltage of the bypass switching component Q2. The third resistor R3 is electrically connected between the impedance component R4 and the drive switching component Q1 for preventing the voltage across the drive switching component Q1 from being too high. The drive switching component Q1 is electrically connected between the control terminal Q23 of the bypass switching component Q2 and the ground GND. The drive switching component Q1 is a field effect transistor, including a first terminal Q11 that is a drain terminal, a second terminal Q12 that is a source terminal, and a control terminal Q13 that is a gate terminal. The first terminal Q11 is electrically connected to the control terminal Q23 of the bypass switching component Q2, and the second terminal Q12 is electrically connected to the ground GND. The control terminal Q13 is used to control whether the first terminal Q11 and the second terminal Q12 are conducted to each other.

The first detection unit 413 includes a first resistor R1, a second resistor R2, and a first capacitor C1. The first resistor R1 is electrically connected to the power supply unit 10 and connected to the second resistor R2 in series. The second resistor R2 is electrically connected to the ground GND and connected in parallel to the first capacitor C1. The first capacitor C1 is used for delaying the drive switching component Q1 of the first drive circuit 412 to be turned on. In the first embodiment of the present invention, the control terminal Q13 of the drive switching component Q1 is electrically connected to a node between the first resistor R1 and the second resistor R2. The impedance component R4 is connected to the Zener diode Z in parallel and connected to the third resistor R3 in series. The third resistor R3 is then electrically connected to the first terminal Q11 of the drive switching component Q1. The control terminal Q23 of the bypass switching component Q2 is electrically connected to a node between the third resistor R3 and the impedance component R4.

Accordingly, when the power supply unit 10 outputs the second power signal V2, the input voltage corresponding to the second power signal V2 is divided by the first resistor R1 and the second resistor R2 and delayed by the first capacitor C1 to cause the drive switching component Q1 to be turned on. Since the driving switching component Q1 is turned on, the first terminal Q21 and the control terminal Q23 of the bypass switching component Q2 are forward-biased by the Zener diode Z and the impedance component R4, and then the first terminal Q21 and the second terminal Q22 of the bypass switching component Q2 are conducted to each other, such that the second lighting module 32 is bypassed by the bypass switching component Q2 which is connected in parallel without emitting light. At this time, only the first lighting module 31 still emits light. When the power supply unit 10 does not supply the second power signal V2, the drive switching component Q1 is not turned on, and the first terminal Q21 and the control terminal Q23 of the bypass switching component Q2 cannot be forward-biased. Therefore, the first terminal Q21 and the second terminal Q22 of the bypass switching component Q2 are not conducted to each other, and the second lighting module 32 emits light together with the first lighting module 31 at the same time because the bypass switching component Q2 which is connected in parallel is open-circuit.

As above, when the electrical physical quantity (e.g., voltage) of the first power signal V1 and the electrical physical quantity of the second power signal V2 are not zero, the lighting unit 30 is in a first mode, in which the first lighting module 31 emits light and the second lighting module 32 does not emit light. When the electrical physical quantity of the first power signal V1 is not zero and the electrical physical quantity of the second power signal V2 is zero, the lighting unit 30 is in a second mode, in which both the first lighting module 31 and the second lighting module 32 emit light. When the electrical physical quantity of the first power signal V1 is zero, the lighting unit 30 is in a third mode, in which neither the first lighting module 31 nor the second lighting module 32 emits light.

In addition, when the first lighting module 31 and the second lighting module 32 are switched from both emitting light to only the first lighting module 31 emitting light but the second lighting module 32 not, the output capacitor C3 which is connected in parallel to the first lighting module 31 and the second lighting module 32 causes an inrush current to be injected into the first lighting module 31 due to the instantaneous voltage change of the output capacitor C3 and the continuous energy delivery of the power conversion unit 20. To avoid this phenomenon, the lighting system 1a is provided with the first reset unit 51. The first reset unit 51 includes a reset switching component Q3, a bias resistor R5, and a second capacitor C2. The reset switching component Q3 is electrically connected between the power conversion unit 20 and the ground GND as shown in FIG. 2, wherein the reset switching component Q3 is a field effect transistor, including a first terminal Q31 that is a drain terminal, a second terminal Q32 that is a source terminal, and a control terminal Q33 that is a gate terminal. The first terminal Q31 is electrically connected to the power conversion unit 20, the second terminal Q32 is electrically connected to the ground GND, and the control terminal Q33 controls whether the first terminal Q31 and the second terminal Q32 are conducted to each other. The bias resistor R5 is electrically connected between the control terminal Q33 of the reset switching component Q3 and the ground GND. The second capacitor C2 is electrically connected to the control terminal Q33 of the reset switching component Q3 for receiving the second power signal V2.

In this way, when the first reset unit 51 receives the input voltage corresponding to the second power signal V2, the control terminal Q33 of the reset switching component Q3 controls the first terminal Q31 and the second terminal Q32 to be conducted to each other. In doing so, the first reset unit 51 can briefly shut down the power conversion unit 20 (i.e., the power conversion unit 20 stops operating). During the shut-down period, the second capacitor C2 begins to charge. Until the second capacitor C2 is fully charged, the first terminal Q31 and the second terminal Q32 are no longer conducted to each other. Then, the power conversion unit 20 can restart (i.e., the power conversion unit 20 goes back to the normal operation). Furthermore, the conduction of the first bypass circuit 411 is delayed in coordination with the first capacitor C1 of the first detection circuit 413, such that the output capacitor C3 has sufficient time to discharge. Therefore, the inrush current can be effectively suppressed while the lighting unit 30 is switched from the second mode to the first mode. Accordingly, when the power supply unit 10 does not supply the second power signal V2, the first reset unit 51 does not operate. When the power supply unit 10 starts to supply the second power signal V2, the first terminal Q31 and the second terminal Q32 of the first reset unit 51 are conducted to each other, such that the power conversion unit 20 temporarily shut down and does not supply any current to the first lighting module 31 and the output capacitor C3 (i.e., the current that is outputted to the first lighting module 31 is supplied by the output capacitor C3 at this period). Namely, the current corresponding to the first power signal V1 is not resupplied to the first lighting module 31 and the output capacitor C3 unless the power conversion unit 20 is restarted.

In addition to the circuit components described above, in FIG. 2, the internal circuit of the power conversion unit 20 also includes other circuit components, such as a resistor R, a capacitor C, an inductance L, a diodes D, a transistor Q, or a controller circuit, used for voltage division, voltage regulation, or switching, etc. Since the technology of other circuit components is not the focus of the present invention, its detail is not be described herein.

Figure 3:
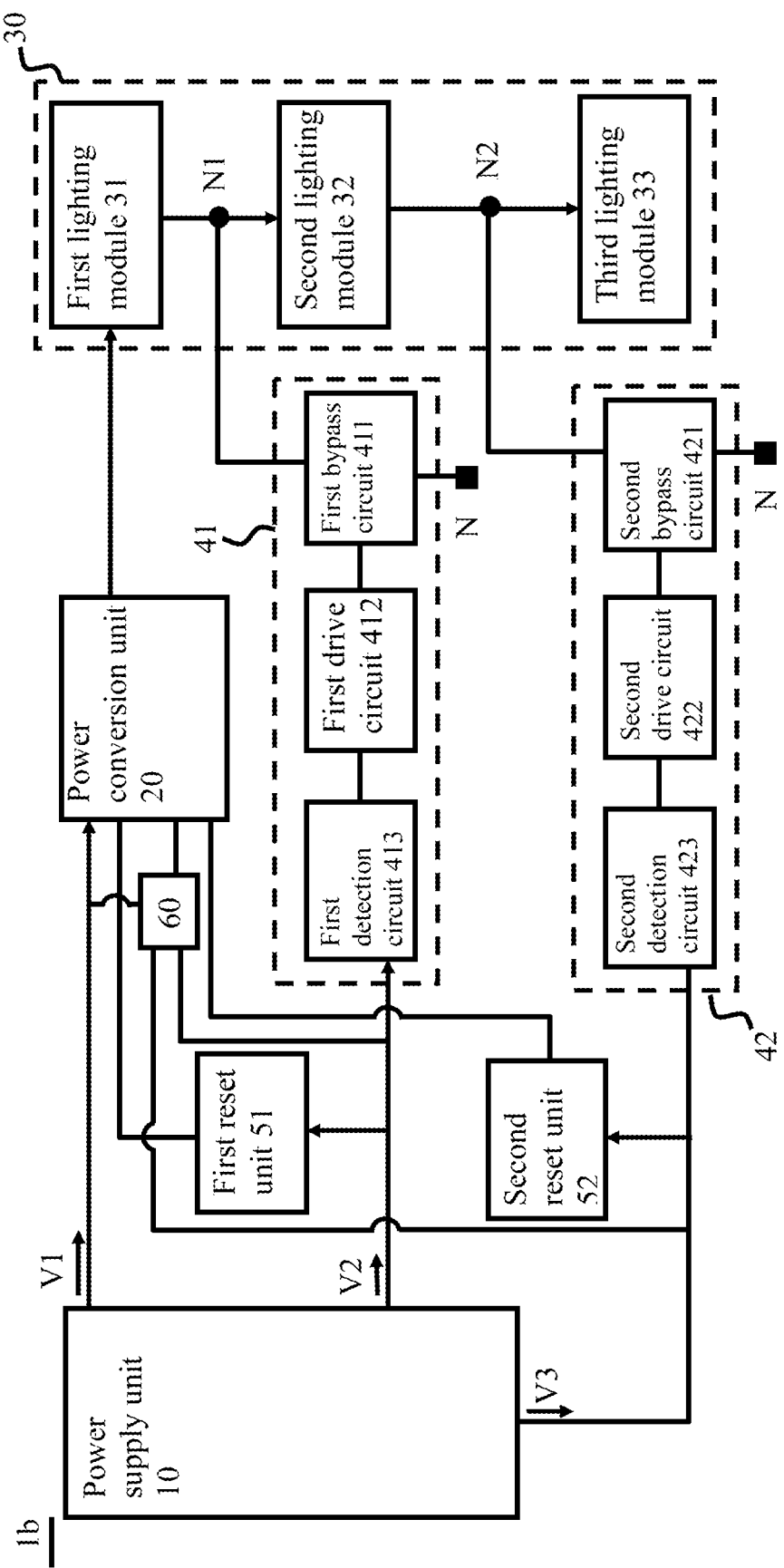
FIG. 3 is an architecture diagram of a lighting system in a second embodiment of the present invention.

Then, please refer to FIG. 3 for a schematic diagram of a lighting system in a second embodiment of the present invention.

The present invention does not limit the number of lighting modules in the lighting unit 30. In the second embodiment of the present invention, the lighting unit 30 of the lighting system 1b further includes a third lighting module 33. The third lighting module 33 is connected in series after the second lighting module 32. The power supply unit 10 further provides a third power signal V3. Additionally, the lighting system 1b further includes a second switching unit 42 and a second reset unit 52. The second switching unit 42 is electrically connected to the power supply unit 10 for receiving the third power signal V3, and electrically connected to a second node N2 between the second lighting module 32 and the third lighting module 33 to cause the third lighting module 33 to emit light or not according to the third power signal V3.

Further, the second switching unit 42 includes a second bypass circuit 421, a second drive circuit 422, and a second detection circuit 423. The second bypass circuit 421 is electrically connected between the second node N2 and the negative terminal N. The second drive circuit 422 is electrically connected to the second bypass circuit 421. The second detection circuit 423 is electrically connected to the second drive circuit 422 for receiving the third power signal V3. The second switching unit 42 has the same function as the first switching unit 41, so the circuit configuration of the second switching unit 42 in this embodiment is similar to that of the first switching unit 41.

Accordingly, when the power supply unit 10 only supplies the first power signal V1, the current generated corresponding to the first power signal V1 flows through the first lighting module 31, the second lighting module 32 and the third lighting module 33 that are connected to each other in series, such that the first lighting module 31, the second lighting module 32 and the third lighting module 33 emit light at the same time. When the power supply unit 10 further supplies the second power signal V2, the first detection circuit 413 detects the second power signal V2. Then, the first bypass circuit 411 is on by the first drive circuit 412, such that the current generated corresponding to the first power signal V1 flows directly from the first node N1 to the negative terminal N because the second lighting module 32 and the third lighting module 33 are bypassed without emitting light. Finally, when the power supply unit 10 supplies the first power signal V1 and the third power signal V3 (yet the second power signal V2 is not supplied), the second detection circuit 423 detects the third power signal V3. Then, the second bypass circuit 421 is on by the second drive circuit 422, such that the current generated corresponding to the first power signal V1 flows directly from the second node N2 to the negative terminal N because third lighting module 33 is bypassed without emitting light (only the first lighting module 31 and the second lighting module 32 emit light).

To prevent the lighting unit 30 from being damaged by the inrush current during switching, the lighting system 1b is further provided with a second reset unit 52. The second reset unit 52 is electrically connected to the power supply unit 10 and the power conversion unit 20 for receiving the third power signal V3. When the third lighting module 33 changes from lighting to no lighting, the second reset unit 52 causes the power conversion unit 20 to stop operating and then restart to suppress the raise of the inrush current. The second reset unit 52 has the same function as the first reset unit 51, and the circuit configuration of the second reset unit 52 in this embodiment is similar to that of the first reset unit 51.

Figure 4:
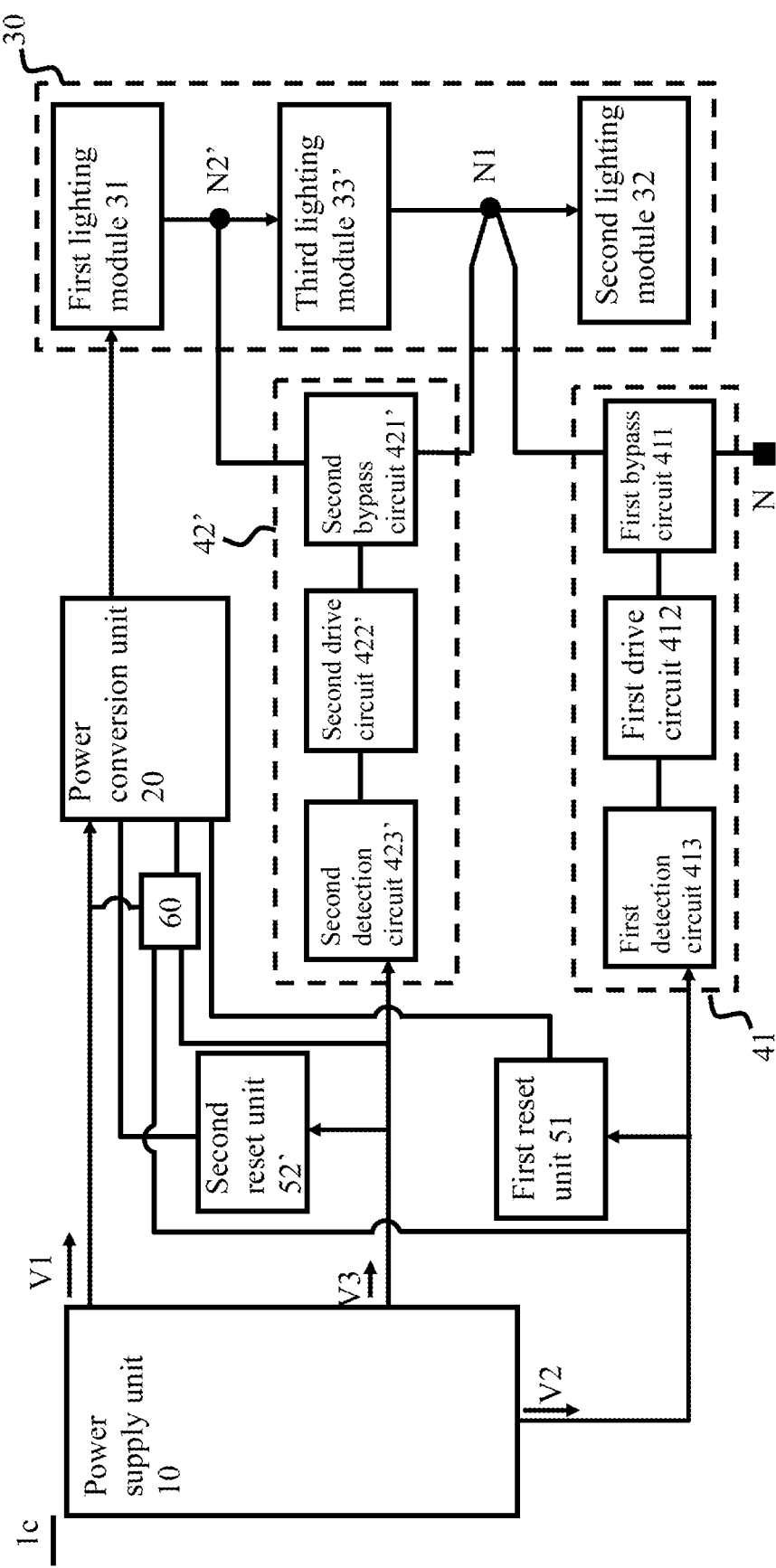
FIG. 4 is an architecture diagram of a lighting system in a third embodiment of the present invention.

Finally, please refer to FIG. 4 for a schematic diagram of a lighting system in a third embodiment of the present invention.

In the third embodiment of the present invention, the third lighting module 33' of the lighting system 1c is connected in series between the first lighting module 31 and the second lighting module 32. Particularly, the second switching unit 42' is electrically connected to the power supply unit 10 for receiving the third power signal V3, and electrically connected to a second node N2' between the first lighting module 31 and the third lighting module 33' to enable the third lighting module 33' to emit light or not according to the third power signal V3. The second switching unit 42' includes a second bypass circuit 421', a second drive circuit 422' and a second detection circuit 423'. The second bypass circuit 421' is electrically connected between the first node N1 and the second node N2'. The second drive circuit 422' is electrically connected to the second bypass circuit 421'. The second detection circuit 423' is electrically connected to the second drive circuit 422' for receiving the third power signal V3.

Accordingly, when the power supply unit 10 only supplies the first power signal V1, the current generated corresponding to the first power signal V1 flows through the first lighting module 31, the third lighting module 33', and the second lighting module 32 that are connected to each other in series, so the first lighting module 31, the second lighting module 32 and the third lighting module 33' emit light at the same time. When the power supply unit 10 further supplies the second power signal V2, the first detection circuit 413 detects the second power signal V2, and then the first bypass circuit 411 is on by the first drive circuit 412. Therefore, the current generated corresponding to the first power signal V1 flows directly from the first node N1 to the negative terminal N because the second lighting module 32 is bypassed without emitting light, thus the first lighting module 31 and the third lighting module 33' keep emitting light. When the power supply unit 10 supplies the first power signal V1 and the third power signal V3 (yet the second power signal V2 is not supplied), the second detection circuit 423' detects the third power signal V3. Then, the second bypass circuit 421' is on by the second drive circuit 422', such that the current generated corresponding to the first power signal V1 flows directly from the second node N2' to the first node N1 because the third lighting module 33' is bypassed without emitting light, thus only the first lighting module 31 and the second lighting module 32 emit light. Finally, when the power supply unit 10 supplies the first power signal V1, the second power signal V2 and the third power signal V3, the second lighting module 32 and the third lighting module 33' are bypassed without emitting light, resulting in that only the first lighting module 31 emits light.

Similarly, to prevent the lighting unit 30 from being damaged by the inrush current during switching, the lighting system 1c is further provided with a second reset unit 52'. The second reset unit 52' is electrically connected to the power supply unit 10 and the power conversion unit 20 for receiving the third power signal V3. When the third lighting module 33' changes from lighting to no lighting, the second reset unit 52' causes the power conversion unit 20 to stop operating and then restart for suppressing the raise of inrush current. The second reset unit 52' has the same function as the first reset unit 51, so the circuit configuration of the second reset unit 52' in this embodiment is similar to that of the first reset unit 51.

Further, both the lighting systems 1b and 1c in the present invention include a light dimming module 60. The light dimming module 60 of the lighting systems 1b and 1c is also electrically connected to the power conversion unit 20. The light dimming module 60 is also electrically connected to the input circuits of the first power signal V1, the second power signal V2 and the third power signal V3 to adjust the current that is generated by the power conversion unit 20 corresponding to the first power signal V1 and is outputted to the lighting unit 30, according to the condition of whether the first power signal V1, the second power signal V2 or the third power signal V3 is inputted to the light dimming module 60. It should be noted that, in other variations of the present invention, the light dimming module 60 may be only electrically connected to the power conversion unit 20, instead of being electrically connected to the input circuits of the first power signal V1, the second power signal V2, and the third power signal V3.

As above, the lighting systems 1a, 1b and 1c of the present invention can control single lighting module or plural lighting modules of the lighting unit 30 to emit light, and can effectively suppress the raise of the inrush current when the lighting module is switched.

It should be noted that the preferred embodiments of the present invention described above are merely illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. All without departing from the scope of the invention are defined solely by the appended claims.

What is claimed is:

1. A lighting system, comprising:
a power supply unit, used to supply a first power signal and a second power signal;
a power conversion unit, electrically connected to the power supply unit, for receiving and converting the first power signal;
a lighting unit, including a first lighting module and a second lighting module connected to each other in series, wherein the first lighting module is electrically connected to the power conversion unit and emits light or not according to the first power signal;
a first switching unit, electrically connected to the power supply unit for receiving the second power signal, and electrically connected to a first node between the first lighting module and the second lighting module to cause the second lighting module to emit light or not according to the second power signal; and
a first reset unit, electrically connected to the power supply unit and the power conversion unit for receiving the second power signal; wherein when the second lighting module is changed from lighting to no lighting, the first reset unit causes the power conversion unit to stop operating and then restart.

2. The lighting system as claimed in claim 1, wherein when an electrical physical quantity of the first power signal and an electrical physical quantity of the second power signal are not zero, the lighting unit is in a first mode, in which the first lighting module emits light and the second lighting module does not emit light; when the electrical physical quantity of the first power signal is not zero and the electrical physical quantity of the second power signal is zero, the lighting unit is in a second mode, in which both the first lighting module and the second lighting module emit light; when the electrical physical quantity of the first power signal is zero, the lighting unit is in a third mode, in which neither the first lighting module nor the second lighting module emits light.

3. The lighting system as claimed in claim 1, wherein the first switching unit comprising:
   a first bypass circuit, electrically connected between the first node and a negative terminal;
   a first drive circuit, electrically connected to the first bypass circuit; and
   a first detection circuit, electrically connected to the first drive circuit, and used to receive the second power signal.

4. The lighting system as claimed in claim 3, wherein the first drive circuit causes the first bypass circuit to be open or on according to the second power signal; when the first lighting module emits light and the first bypass circuit is open, the second lighting module emits light; when the first lighting module emits light and the first bypass circuit is on, the second lighting module does not emit light.

5. The lighting system as claimed in claim 3, wherein the first bypass circuit includes a bypass switching component, which is electrically connected between the first node and the negative terminal; the bypass switching component comprising:
   a first terminal, electrically connected to the first node;
   a second terminal, electrically connected to the negative terminal; and
   a control terminal, used to control whether the first terminal and the second terminal are conducted to each other.

6. The lighting system as claimed in claim 5, wherein the first drive circuit comprising:
   an impedance component, electrically connected between the first node and a control terminal of the bypass switching component; and
   a drive switching component, electrically connected between the control terminal of the bypass switching component and a ground; wherein the drive switching component includes a first terminal, a second terminal, and a control terminal, the first terminal is electrically connected to the control terminal of the bypass switching component, the second terminal is electrically connected to the ground, and the control terminal is used to control whether the first terminal and the second terminal are conducted to each other.

7. The lighting system as claimed in claim 3, wherein the first detection circuit includes a first resistor, a second resistor and a first capacitor, and the first drive circuit includes a Zener diode, a third resistor, an impedance component, and a first field effect transistor, and the first bypass circuit is a second field effect transistor, wherein the first field effect transistor includes a first source terminal, a first gate terminal, and a first drain terminal, and the second field effect transistor includes a second source terminal, a second gate terminal, and a second drain terminal.

8. The lighting system as claimed in claim 7, wherein the first resistor is electrically connected to the power supply unit and connected to the second resistor in series, the second resistor is electrically connected to a ground and connected to the first capacitor in parallel, the first gate terminal is electrically connected to a node between the first resistor and the second resistor, the first source terminal is electrically connected to the ground, the impedance component is connected to the Zener diode in parallel, and connected to the third resistor in series, the third resistor is then electrically connected to the first drain terminal, the second gate terminal is electrically connected to a node between the third resistor and the impedance component, the second source terminal is electrically connected to the first node, and the second drain terminal is electrically connected to the negative terminal.

9. The lighting system as claimed in claim 1, wherein the first reset unit comprising:
   a reset switching component, electrically connected between the power conversion unit and a ground, wherein the reset switching component includes a first terminal, a second terminal, and a control terminal, the first terminal is electrically connected to the power conversion unit, the second terminal is electrically connected to the ground, and the control terminal controls whether the first terminal and the second terminal are conducted to each other;
   a bias resistor, electrically connected between the control terminal of the reset switching component and the ground; and
   a second capacitor, electrically connected to the control terminal of the reset switching component, for receiving the second power signal.

10. The lighting system as claimed in claim 1, further comprising a light dimming module electrically connected to the power conversion unit for adjusting the current generated by the power conversion unit corresponding to the first power signal.

11. The lighting system as claimed in claim 1, wherein the lighting unit further comprises a third lighting module, which is connected in series between the first lighting module and the second lighting module; the power supply unit further provides a third power signal; the lighting system further comprising:
   a second switching unit, electrically connected to the power supply unit for receiving the third power signal, and electrically connected to a second node between the first lighting module and the third lighting module to cause the third lighting module to emit light or not according to the third power signal; and
   a second reset unit, electrically connected to the power supply unit and the power conversion unit, for receiving the third power signal; wherein when the third lighting module changes from lighting to no lighting, the second reset unit causes the power conversion unit to stop operating and then restart.

12. The lighting system as claimed in claim 11, wherein the second switching unit comprising:
   a second bypass circuit, electrically connected between the first node and the second node;
   a second drive circuit, electrically connected to the second bypass circuit; and
   a second detection circuit, electrically connected to the second drive circuit, for receiving the third power signal.

13. The lighting system as claimed in claim 1, wherein the lighting unit further includes a third lighting module, which is connected in series to the second lighting module; the power supply unit further provides a third power signal; the lighting system further comprising:
   a second switching unit, electrically connected to the power supply unit for receiving the third power signal, and electrically connected to a second node between the second lighting module and the third lighting module to cause the third lighting module to emit light or not according to the third power signal; and a second reset unit, electrically connected to the power supply unit and the power conversion unit, for receiving the third power signal; wherein when the third lighting module changes from lighting to no lighting, the second reset unit causes the power conversion unit to stop operating and then restart.

14. The lighting system as claimed in claim 13, wherein the second switching unit comprising:
   a second bypass circuit, electrically connected between the second node and a negative terminal;
   a second drive circuit, electrically connected to the second bypass circuit; and
   a second detection circuit, electrically connected to the second drive circuit, for receiving the third power signal.

* * * * *